United States Patent [19]

Marcus

[11] Patent Number: 5,578,262
[45] Date of Patent: Nov. 26, 1996

[54] INJECTION BLOW MOLDING HAVING REDUCED MOLDING CYCLE TIMES

[76] Inventor: Paul Marcus, 6 Bayberry Dr., Saddle River, N.J. 07458

[21] Appl. No.: 495,855

[22] Filed: Jun. 28, 1995

Related U.S. Application Data

[60] Division of Ser. No. 309,103, Sep. 20, 1994, Pat. No. 5,501,589, which is a continuation-in-part of Ser. No. 224,042, Apr. 7, 1994, and a continuation-in-part of Ser. No. 282,530, Jul. 28, 1994.

[51] Int. Cl.$^6$ .............................. B29C 49/06; B29C 49/64
[52] U.S. Cl. .............................. 264/532; 264/537; 425/526
[58] Field of Search .................................. 264/532, 537, 264/297.2, 328.14; 425/526, 529, 533, 534, 547, 552, 556

[56] References Cited

U.S. PATENT DOCUMENTS

| | | | |
|---|---|---|---|
| 3,011,216 | 12/1961 | Gussoni | 264/297.2 |
| 4,061,705 | 12/1977 | Marcus | 264/537 |
| 4,285,657 | 8/1981 | Ryder | 264/537 |
| 4,352,777 | 10/1982 | Valyi | 264/532 |
| 4,376,090 | 3/1983 | Marcus | 264/537 |
| 4,473,515 | 9/1984 | Ryder | 264/532 |
| 4,604,258 | 8/1986 | Valyi | 264/537 |
| 4,950,152 | 8/1990 | Brun, Jr. et al. | 264/537 |

*Primary Examiner*—Catherine Timm
*Attorney, Agent, or Firm*—Kane, Dalsimer, Sullivan, Kurucz, Levy, Eisele and Richard LLP

[57] ABSTRACT

A parison injection blow molding apparatus and method injection molds parisons, transfers them to cooling stations then to orient-stretch blow stations and thereafter ejection stations. While at the injection molding station, cooling stations and during transfer therebetween prior to being placed at the blow stations, the parisons are continuously cooled. The parisons are transferred to each station by an axially and laterally indexing platen.

4 Claims, 14 Drawing Sheets

INJECTION BLOW MOLDING HAVING REDUCED MOLDING CYCLE TIMES

REFERENCE TO RELATED APPLICATIONS

This is a division of application Ser. No. 08/309,103, filed Sep. 20, 1994 now U.S. Pat. No. 5,501,589, which is a continuation-in-part of application Ser. No. 08/224,042 filed Apr. 7, 1994 and Ser. No. 08/282,530 filed Jul. 28, 1994 both entitled "Parison Molding Apparatus and Method".

BACKGROUND OF THE INVENTION

The present invention is applicable to a single stage process by which parisons are produced in an injection mold, cooled, perhaps conditioned, orientation-stretched and blow molded. In this manner, oriented hollow plastic bottles are formed. Polyethylene terephthalate (PET) is typical of the plastic material used.

Heretofore cooling of parisons sufficiently for transporting them to conditioning or orientation-stretch blow molding stations in a single stage process has been time consuming, resulting in inefficiency and poor productivity. However, sufficient cooling is indispensable if the parisons are to maintain their shape upon withdrawing or pulling out the core rod deployed at the injection molding station and during later handling operations. Techniques proposed to date for cooling parisons often times created bottlenecks downstream from the injection molds thereby severely hampering productivity. Obviously, a high rate of production of parisons is important in commercial operation, and the rate at which the injection molding cycle can produce the parisons has been limited by the time taken to cool the parisons sufficiently to allow post molding handling without damage to the parison.

Typically, the hollow plastic parisons produced in the injection molding cycle have relatively thick walls and are molded with PET resin at relatively high temperatures. Consequently, prior to removal from the injection mold, the hollow parison must be cooled sufficiently to prevent deformation during removal and during transit and must be cooled to glass transition temperatures so as to allow orientation. However, the thick parison wall tends to trap heat. Cooling the parison in the injection mold by means of its contact with the cool mold surfaces quickly chills the inner and outer skin, but mold cooling will remove the heat trapped within the wall only by keeping the parison in the injection mold for an extended period of time. Naturally, this is economically prohibitive because high parison production and ultimately bottle protection is not feasible unless cooling of the parison in the injection mold is held at a minimum.

Initial cooling of the molded parison following formation may be sufficient to permit ejection from the injection mold, but additional cooling is then immediately required to remove additional heat as it is conducted to the skin. If the additional cooling were omitted the skin temperature would rise and cause the molded parison to bend or warp while being transported to other stations for conditioning, orient-stretch and blowing. Naturally this is unacceptable.

Many approaches have been proposed to alleviate these problems but they have not proven to be effective and parison and bottle production still could be further optimized.

SUMMARY OF THE INVENTION

A principal object of the present invention is to provide an injection blow molding apparatus and method that is highly efficient, low in cost and that optimizes injection molding cycles thereby increasing parison production and ultimately blown bottle production while at the same time providing adequate cooling of the molded parisons.

Another object is to provide a parison molding apparatus and method of the foregoing type that enables rapid operating cycles by parison injection molding without the necessity for extended cooling time in the injection mold but with extended cooling times outside the injection mold that may be increased many fold to arrive at the desired degree of parison cooling before conditioning and/or blow molding by providing support for the parison while cooling during removal from and outside of the injection molding station.

In accordance with the proposed injection blow molding system a first parison is initially injection molded at an injection molding station about a first core rod assembly disposed in an injection mold cavity defined by a female injection mold and a first neck mold. This female injection mold, first neck mold and first core rod assembly possesses cooling means for cooling the molded parison or where desired heating for parison conditioning. The first core rod assembly and first neck mold are retracted from the female injection mold and then transport the slightly cooled first parison to a first cooling station having a first cooling or conditioning female mold and at which the first core rod assembly and the first neck mold remain with the first parison which is subject to further cooling or conditioning. In this regard, the first core rod assembly may place the parison in intimate contact with the first cooling mold by a form of compression molding or by blowing the parison off the core rod into intimate contact with a slightly enlarge cavity wall of the cooling or conditioning mold. A second core rod assembly and second neck mold which were associated with a previously molded second parison at a second cooling station will be withdrawn from this second parison which will remain in a second female cooling or conditioning mold at the second cooling station and then the second core rod assembly and second neck mold will be moved to the injection molding station and associated with the female injection mold for the next parison molding cycle. The withdrawal of the second core rod assembly and second neck mold and the association of the second neck mold with and the insertion of the second core rod assembly into the female injection mold will occur simultaneously with retraction of the first core rod assembly and first neck mold with the first molded parison and the transport of this first molded parison by the first core rod assembly and first neck mold and its insertion into the first cooling mold at the first cooling station. A third previously formed parison at the first cooling station will simultaneously be retracted by a first transfer bushing and be transferred to a first orient-stretch blow molding station at which the third parison is stretched longitudinally and blown in a first cooled female blow mold. A fourth previously formed parison will have been blow molded at a second orient-stretch blow molding station and thereafter will be suitably ejected at a first ejection station and transferred to a suitable storage or collection area. The second parison at the second cooling station remains in the second cooling mold and then receives a second transfer bushing. Upon the completion of the injection molding of the next parison at the injection molding station about the associated second core rod assembly and second neck mold, the transfer bushing is retracted from the second cooling mold with the second parison and both are moved to the second orient-stretch blow molding station at which the second parison is stretched longitudinally and blown in a second female blow mold. Simultaneously with the retraction of the second core rod assembly and second neck mold from the injection mold and the second transfer bushing with second parison from the second cooling mold, the first core rod assembly and first neck mold is also retracted from the first parison which remains in the first female cooling mold and thereafter is associated with the first transfer bushing at the first cooling station. The second core rod assembly and second neck mold will be shifted back to the injection station and the first parison will be moved to the first orient-stretch blow molding station at which it is stretched and blown into a bottle or other hollow article. Upon completion of the injection molding of the next parison, the blown bottle from the second parison will be ejected at the second ejection station and transported to a collection or storage area. Upon completion of yet another parison injection molding cycle, the blown bottle from the first parison will be ejected at the first ejection station. As will be appreciated, more cooling stations may be interposed between the injection molding station and the orient-stretch blow molding station. Thus, with all of the cooling or conditioning steps established, the injection molding cycle may be shortened to increase parison production and consequently bottle production several fold. In lieu of another cooling station or in series therewith and prior to the orient-stretch blow molding station, a pre-cure station can be incorporated. Other stations prior to or subsequent to ejection can be used for product labeling, decorating, filling, and or automation cartoning.

Other objects and advantages will become apparent from the following detailed description which is to be taken in conjunction with the accompanying drawings.

DETAILED DESCRIPTION OF THE PREFERRED EMBODIMENTS

In the drawings, an injection blow molding machine 10 is illustrated with a plurality of in-line stations, namely, a parison molding station 12, a pair of parison cooling stations 14a and 14b on opposite sides of the parison molding station 12, a pair of orient-stretch blowing stations 16a and 16b spaced outwardly of the respective cooling stations 14a and 14b, and a pair of shiftable ejection stations 18a and 18b spaced outwardly of the respective blowing stations 16a and 16b. As will be readily apparent one or more additional cooling stations may be interposed between stations 14a,b and 16a,b to increase the cooling time of the parison while maintaining the molding cycle constant and at a minimum time wise (see FIG. 13). Alternatively, a pre-cure station may be incorporated, prior to blow molding (see FIG. 14). The apparatus 10 includes a stationary platen 20, and a movable clamping and indexing platen 22 shiftable axially and laterally.

The parison molding station 12 includes a parison mold 26 mounted on platen 20 and that cooperates with a pair of core rod assemblies 28a and 28b mounted on axially and laterally shiftable clamping and indexing platen 22 in forming a parison. In each molding cycle, one of the core rod assemblies is disposed within the cavity of mold 26 for purposes of receiving the injected plastic shot from nozzle 29. The core rod assemblies 28a and 28b include core rods 30a and 30b and associated split neck molds 32a and 32b. The mold 26, core rods 28a, 28b, 30a and 30b and neck molds 32a and 32b molds 36a, 36b, 46a, 46b are temperature controlled and preferably cooled in a manner well known in the art by fluid (air, water or oil). Stretch rods 40a and 40b may also be cooled. For certain types of containers, a one-piece neck mold could be employed. The choice of neck mold depends on the size and shape of containers or bottles being formed. The selected neck mold will remain in a closed position except at such time as it is desired to disassociate the core rod assembly 28a or 28b from the parison at the cooling stations 14a and 14b so that the free rod core assembly may be in a position to return to the parison injection molding station 12 to form another parison.

Figure 1:
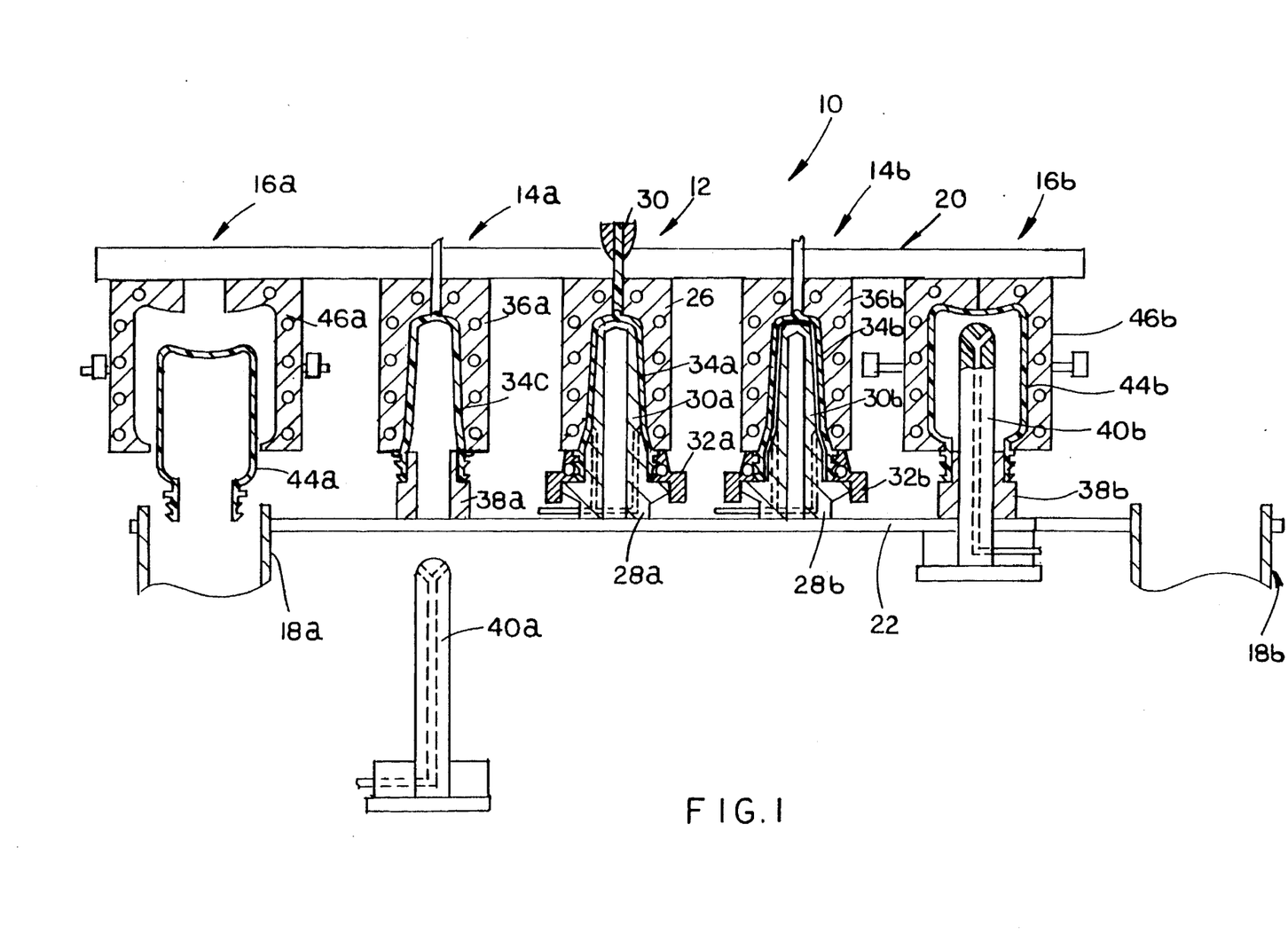
FIG. 1 is a top plan or may be taken as a side elevation view in section of an injection blow molding apparatus of this invention showing the press in a closed or clamped position; the press may open in a vertical or horizontal mode; vertical is preferred.

Upon reciprocation of the indexing platen 22 and assuming the relative position of the parts as shown in FIG. 1, the parison injection mold 26 will be disposed about the core rod 30a into engagement with the closed neck mold 32a also disposed about the core rod 30a to define the parison forming cavity. The first parison 34a is formed upon the injection through nozzle 29 into the cavity at the injection molding station 12 of the selected plastic under controlled pressure and temperature and with uniform density in a manner well known in the art.

As previously stated, the mold 26 is temperature controlled and preferably cooled by fluid (water or oil) in a manner well known in the art. The neck mold 32a is also cooled by fluid to set the configuration of the neck of the parison. The core rod 28a and 30a are similarly cooled or temperature controlled by fluid. In this manner, a skin is formed on the outer and inner surfaces of the parison 34a. The cooling cycle time at the parison injection station 12 is held to a minimum to optimize the production of parisons.

At the relative disposition of the indexing platen 22 as shown in FIG. 1, a previously molded and cooled parison 34c at the first cooling station 14a will have been disassociated earlier from first core rod assembly 28a and neck mold 32a. At the first cooling station 14a, parison 34c will continue to be cooled in mold 36a while associated with the engaged first transfer bushing 38a which can also be cooled by fluid (water or oil). Again, the cooling at the first cooling station 14a of the third parison 34c while on the first transfer bushing 38a will be for the duration of the injection molding cycle. The first transfer bushing 38a can be on indexing plate 22 or on a separate plate if it is desired to remove the parisons further away from molding station 12 and cooling station 14a and 14b when they are transferred to ejection stations 18a and 18b.

The previously molded second parison 34b on core rod assembly 28b is disposed at the cooling station 14b. At this station, parison 34b is placed in second cooling mold 36b which is cooled by fluid (water or oil). Thus, at second cooling station 14b the parison 34b will be cooled by mold 36b and will continue to be cooled by second core rod 30b and neck mold 32b for the duration of the injection molding cycle. In this regard, the second parison 34b may be in intimate contact with the second core rod 28b and second cooling mold 36b similar to a form of compression molding. However, as shown, the second parison 34b is blown off the core rod 30b into intimate contact with the slightly enlarged cavity surfaces of the second cooling mold 36b at the beginning of the cooling cycle. The earlier cooled and transferred fourth parison on the second transfer bushing 38b at orient-stretch blow molding 16b will be stretched and blown in second blow mold 46b into bottle 44b. Mold 46b can be cooled by fluid (water or oil) or in any other conventional manner. The previous blown bottle 44a at ejection station 18a will be disassociated from the second blow mold 46a and transferred to a collection or storage area. As stated, one or more additional cooling stations similar to stations 14a and 14b may be interposed between these stations and orient-stretch blow molding stations 16a and 16b to provide for further cooling of the parison (see FIG. 13).

The stretch and blow rod assemblies 40a and 40b structure are well known in the art and are axially shiftable in associated transfer bushings 38a and 38b, respectively, to stretch and blow the parisons while being held by the bushing into intimate contact with the cavity defining walls of molds 46a and 46b. Again, the cooling at station 14a will be for the duration of the ensuing injection molding cycle. The blow rod assemblies 40a and 40b are on platen 22. In this manner, the earlier cooled and transferred fourth parison on transfer core bushing 38b will be at orient-stretch blowing station 16b at which the parison will be stretched for orientation and blown into the bottle 44b configuration defined by the cavity of split blow mold 46b which is cooled by fluid (water or oil). As previously explained, the stretch and blow rod assemblies 40a and 40b are mounted on platen 22 and relatively reciprocal in the transfer bushings 38a and 38b. The previous blow bottle 44a will remain associated with and cooled in mold 46a. At the end of the injection molding cycle, and before indexing of the platen 22, the first blow mold 46a will open and bottle 44a will be ejected at ejection station 18a to a collecting or storage area. Alternatively, and somewhat preferably, the bottle ejection may be accomplished by deploying transfer bushing in a manner depicted in FIG. 14. As stated, one or more additional cooling stations similar to stations 14a and 14b may be interposed between these stations and the orient stretch blow stations 16a and 16b to provide for further cooling of the parisons.

Since the parison does not expand much further longitudinally at stations 16a, 16b, having already done so by the action of blow rod assemblies 40a, 40b respectively, it does expand radially by the action of blowing dry air under pressure through these blow rod assemblies. The bottle now orients at right angles by blowing to the previous orientation by stretching to thereby form a biaxially oriented bottle. The result is an increase in impact strength and stiffness. Additionally, the biaxial orientation decreases gas permeation factors as well.

Figure 2:
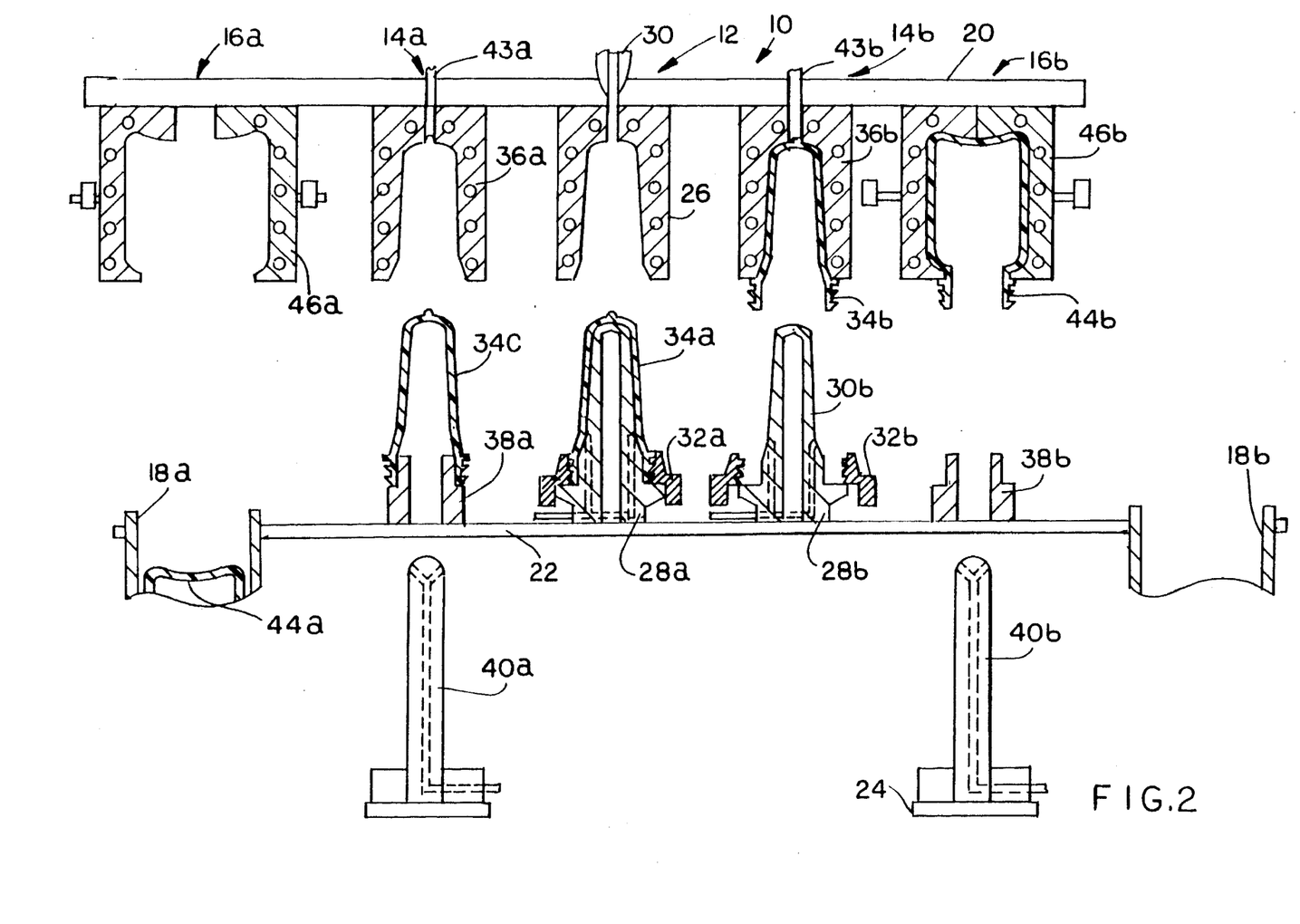
FIG. 2 is a similar top plan view of the press opened.

At the completion of the injection molding cycle, platen 22 is retracted to the position shown in FIG. 2. As shown, parison 34a will be retracted with core rod assembly 28a and closed neck mold 2a. Prior to the retraction of platen 22, the neck mold 32b will have opened thereby permitting the open neck mold to be retracted along with core rod assembly 28b and leave remaining in mold 36b the slightly expanded parison 34b. In this regard, the core rod 30b as is also the case with core rod 30a, may have air jets, ports or longitudinal channels or spaces as shown, that with a blast of air, will expand the parison 34b into intimate with the slightly larger cavity faces of mold 36b so as to readily free the parison 34b from the core rod 30b when the latter is retracted. This expansion of the parison will normally occur shortly after the platen 22 is clamped in the closed position as shown in FIGS. 1, 4, 7 and 10. The parison 34c is removed from mold 36a and retracted with transfer core bushing 38a. In this instance, pressurized air, may be used to free parison 34c from mold 36a or even suction ports on transfer core brushing 38a may be used for this purpose alone or in conjunction with air pressure. The blown bottle 44b will remain at station 16b and in mold 46b and be free of blow rod assembly 40b and transfer core bushing 38b. The split blow mold 46a will open and the blown bottle 44a will be permitted to be transferred at ejection station 18a to the selected storage or collection area at any time during reciprocation of platen 22 from the clamped position of FIG. 1 to the open position of FIG. 2. In this regard, ejection chutes at stations 18a, 18b and the use of suction can be deployed to remove finished bottles. A pick off mechanism or simple gravity discharge may also be employed.

Figure 3:
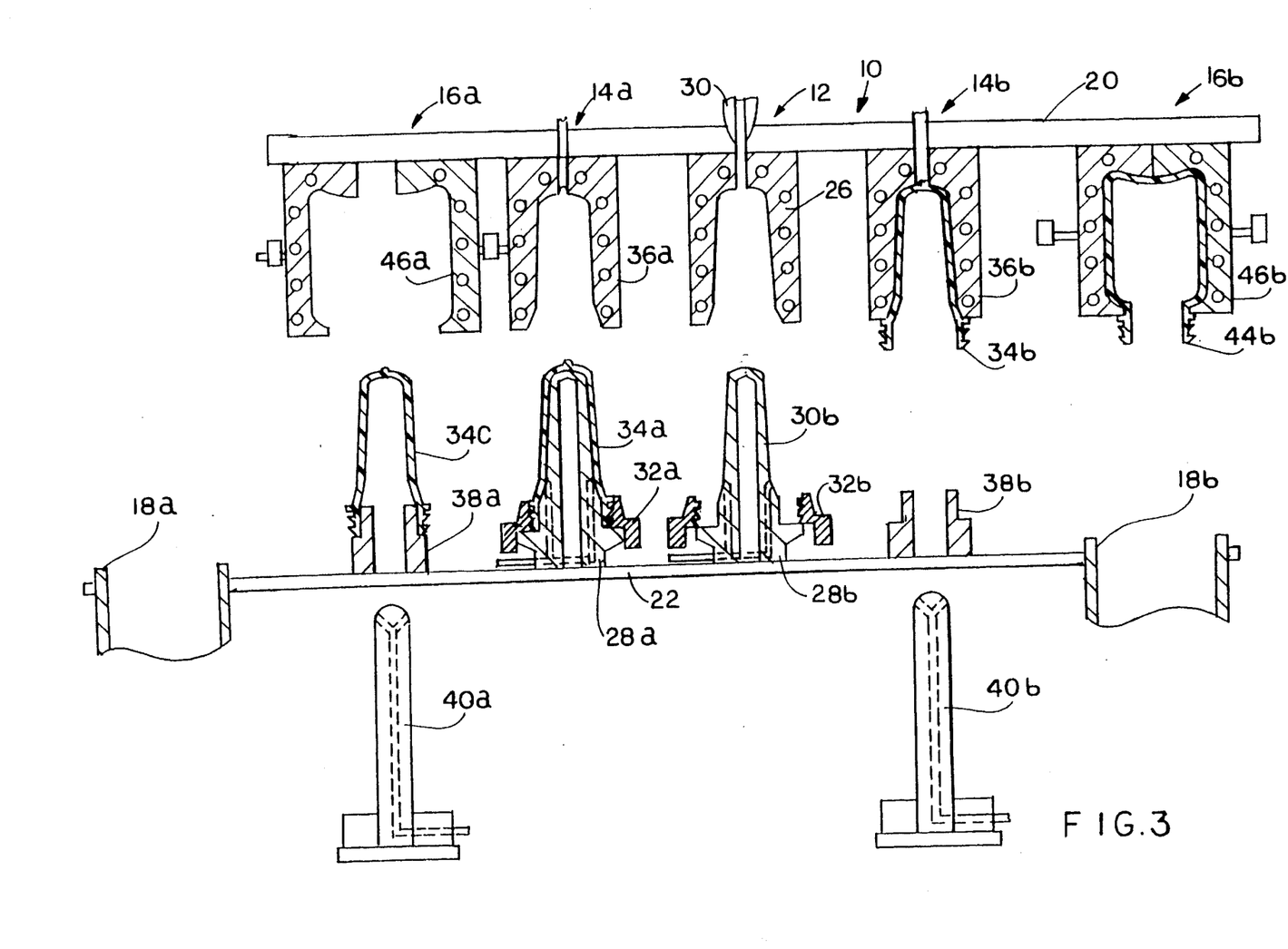
FIG. 3 is a similar plan view with the press still opened and linearly shifted and indexed to the left to transfer a parison to a cooling station, a cooled parison to an orient-stretch blow station, and a blown bottle to an ejection station.

The platen 22 will then be shifted laterally to the left as shown in FIG. 3 so that core rod assembly 28b and neck mold 32b will be axially aligned with mold 26 at the injection molding station 12; and the other rod assemblies and bushings will be aligned as shown. Even during this indexing step, the various parisons will be further cooled.

Figure 4:
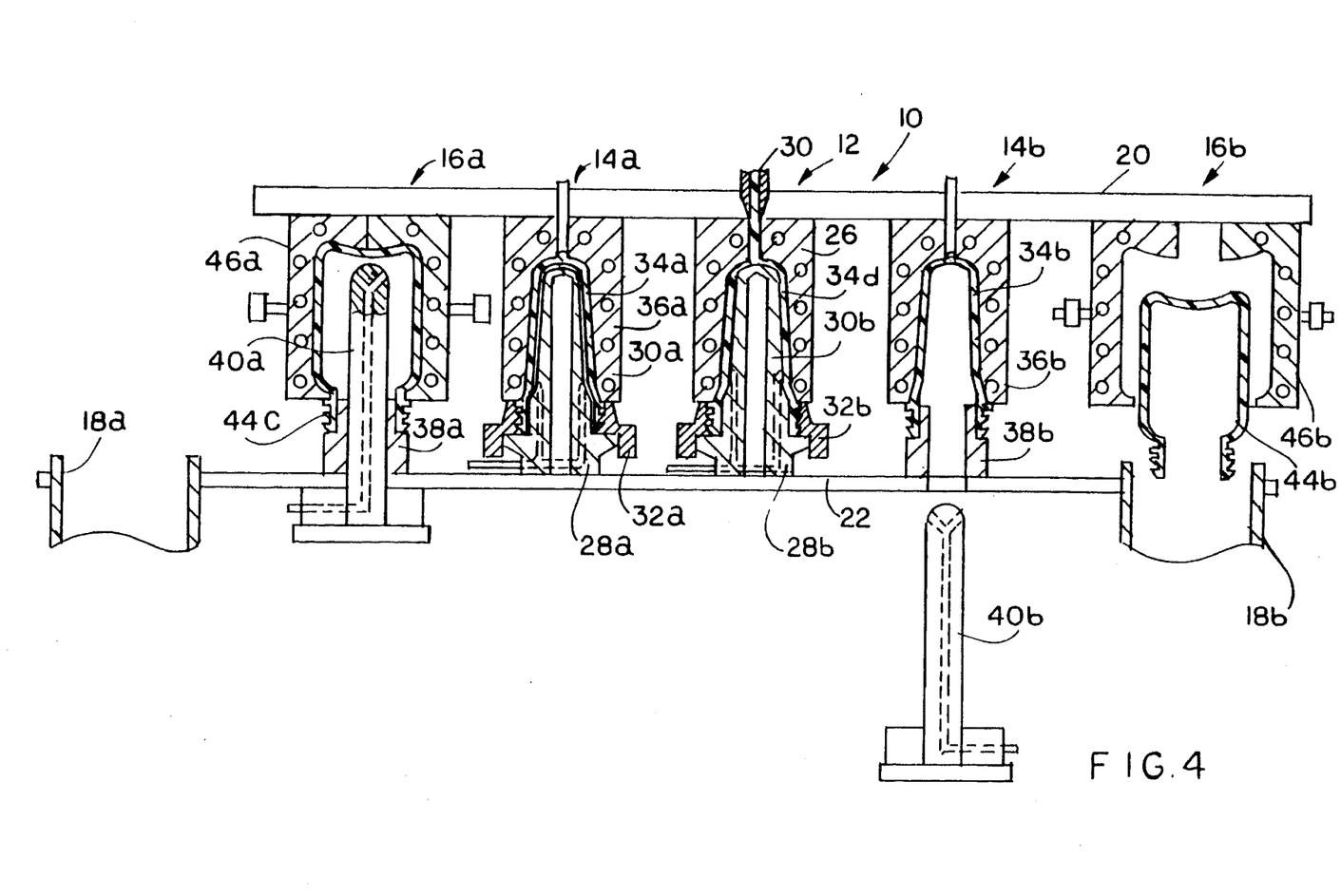
FIG. 4 is a similar plan view with the press clamped and the aligned core rod assemblies with neck molds, transfer bushings and blow rod assemblies inserted in the injection mold, cooling mold and blow mold to start the next parison injection molding cycle, cooling cycle, and orient-stretch blow cycle.
Figure 5:
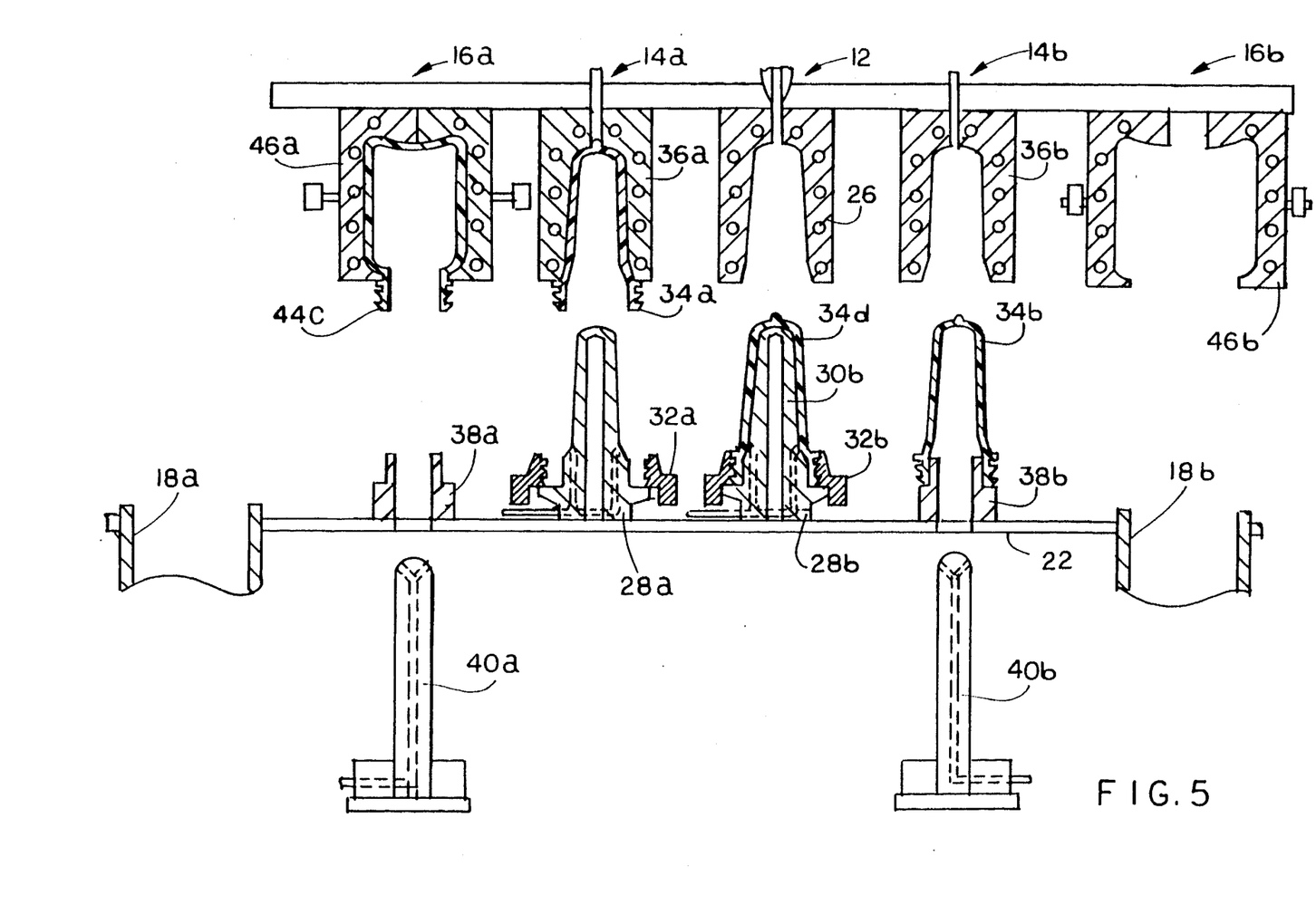
FIG. 5 is a similar plan view with the press opened.
Figure 6:
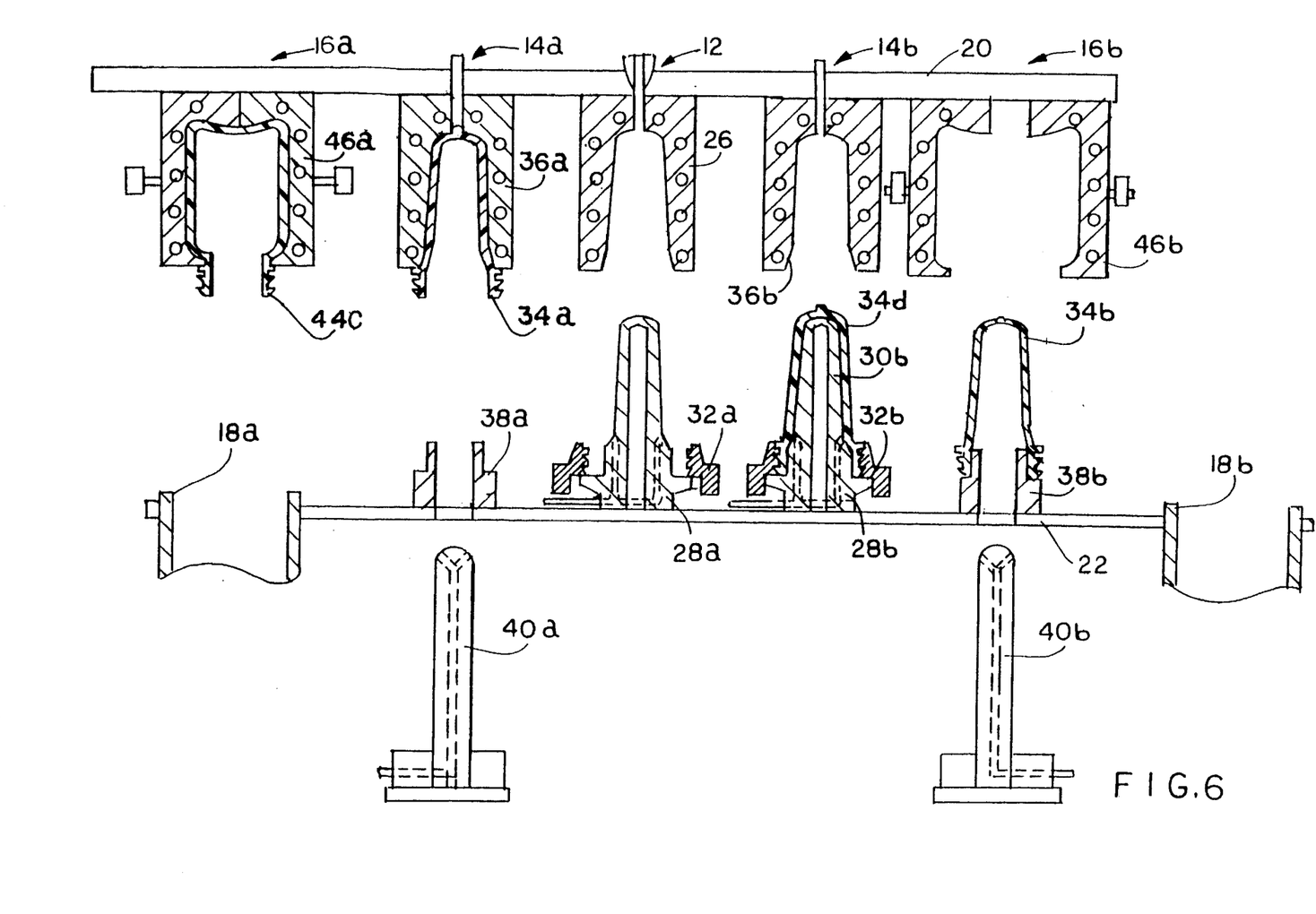
FIG. 6 is a similar plan view with the press still opened and the press shifted and indexed to the right.
Figure 7:
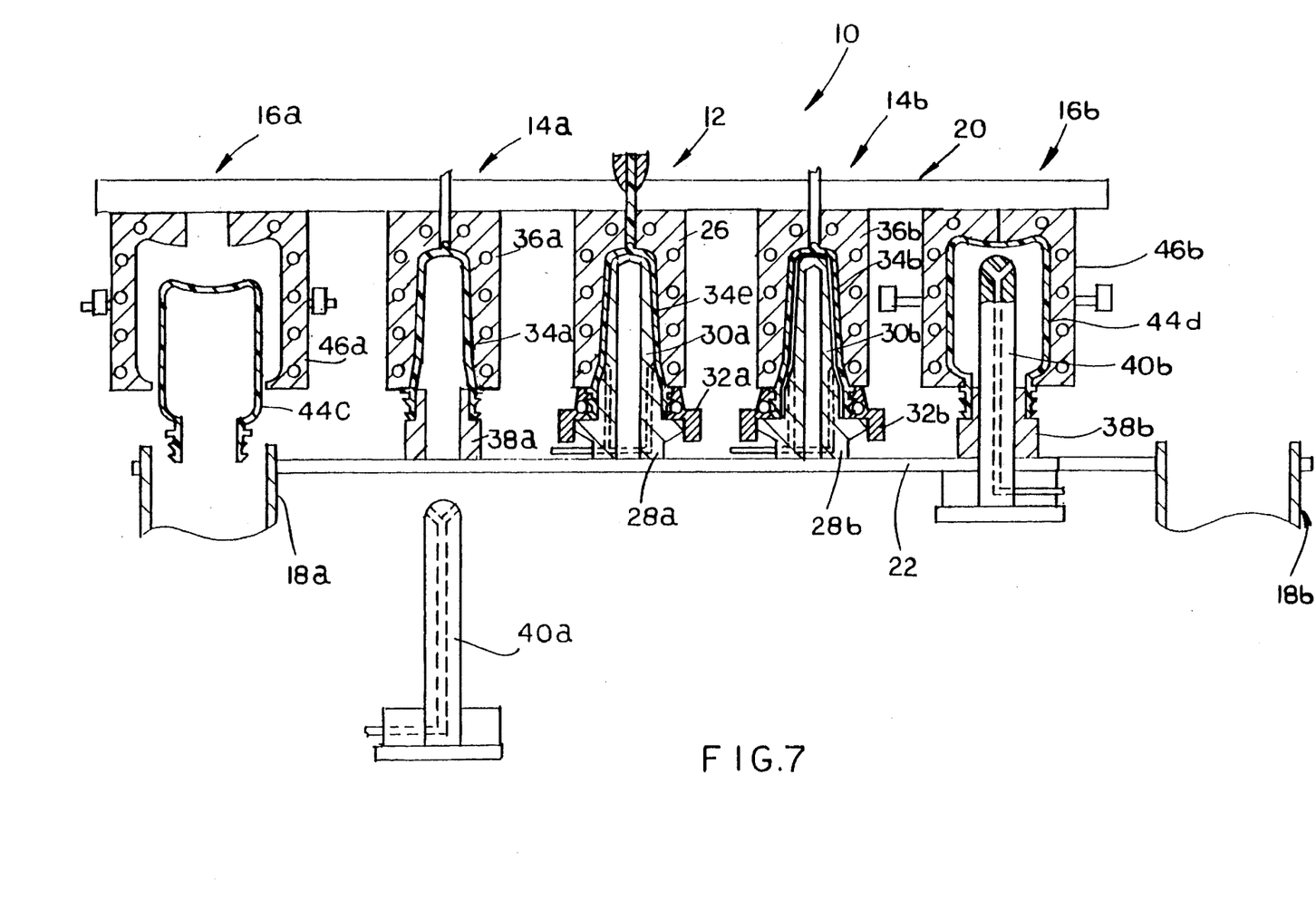
FIG. 7 is a similar plan view with the press clamped to start the next injection molding cycle, cooling cycle and orient-stretch blow cycle.
Figure 8:
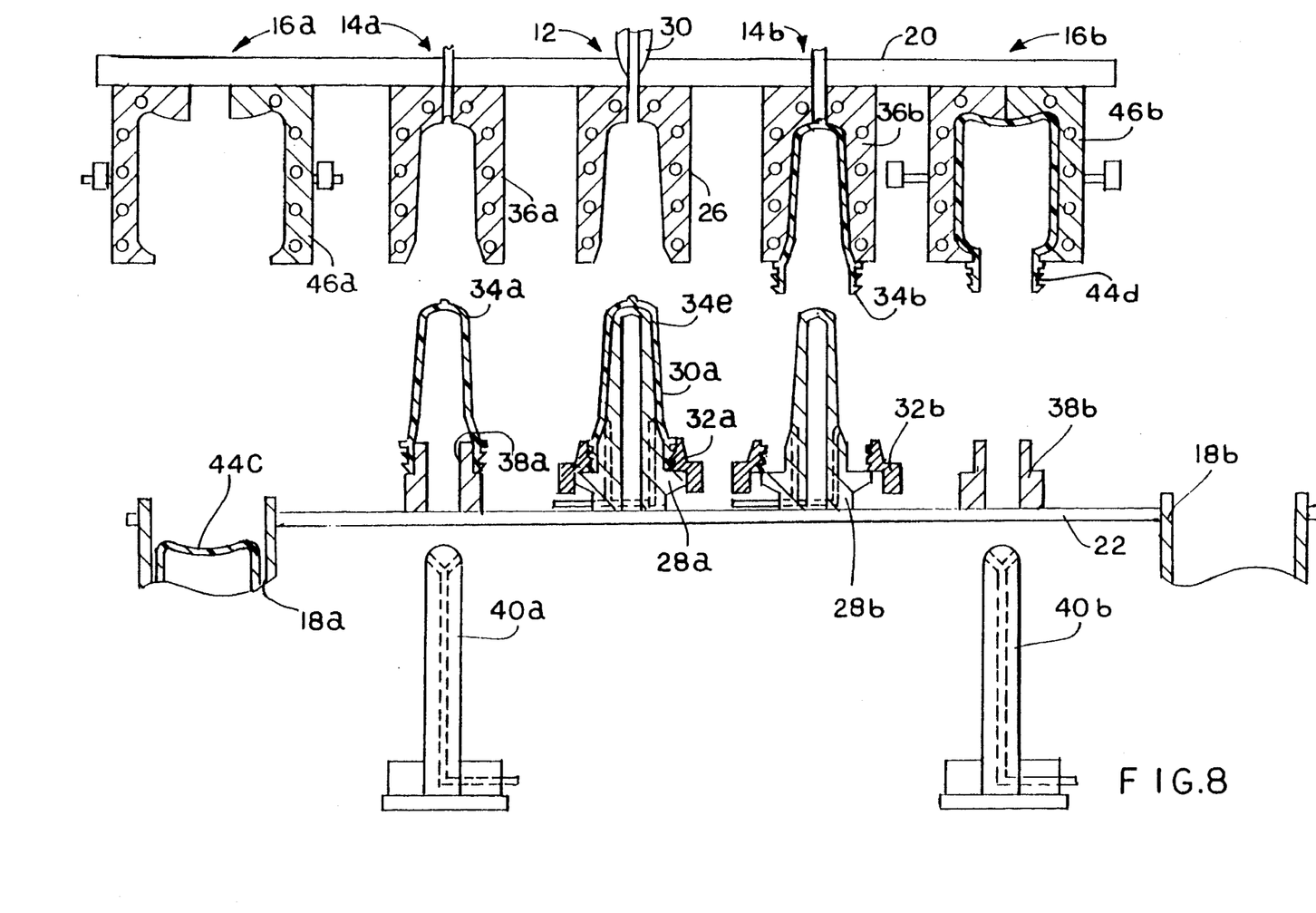
FIG. 8 is a similar plan view with the press opened.
Figure 9:
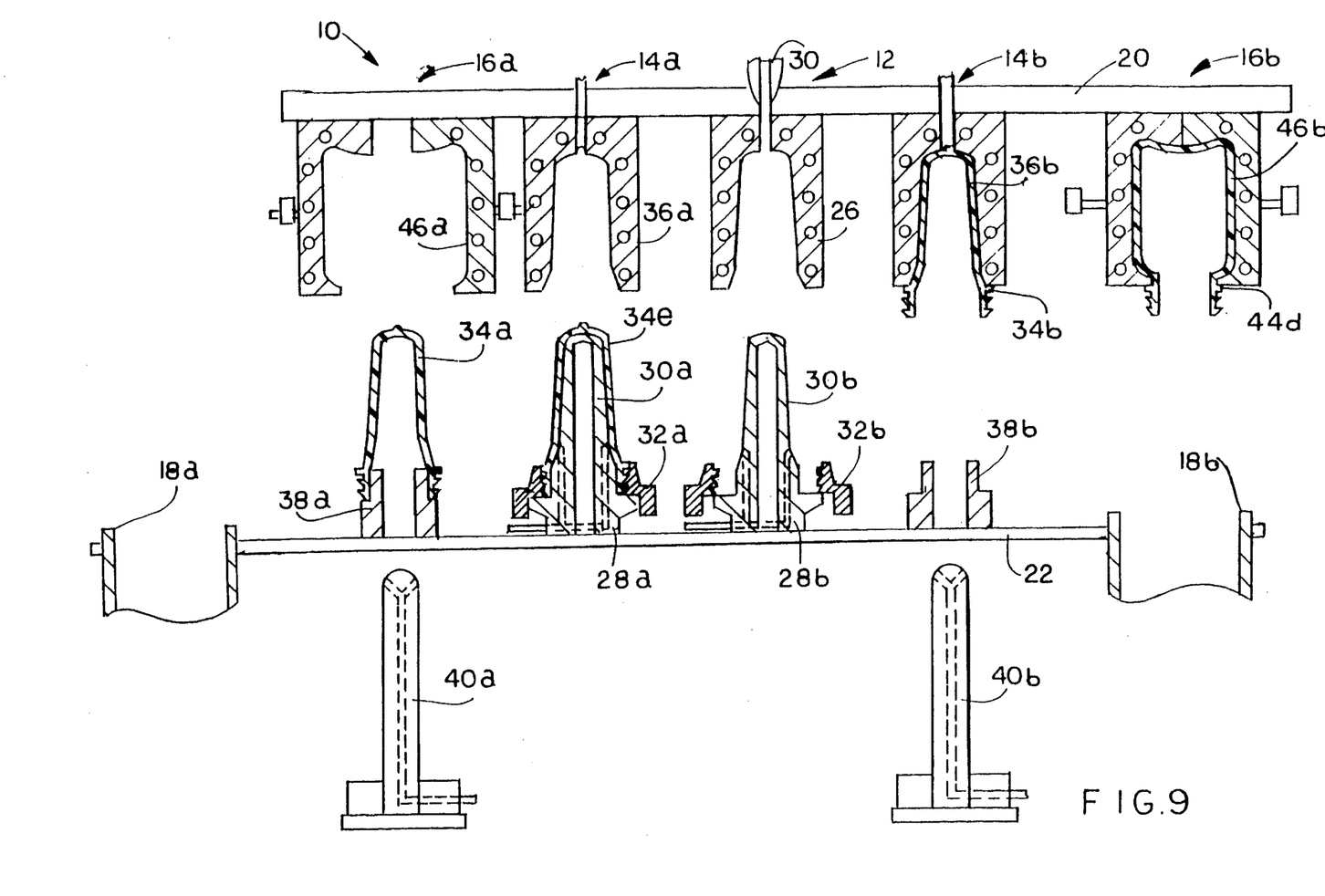
FIG. 9 is a similar plan view with the press still opened and the press shifted and indexed to the left.
Figure 10:
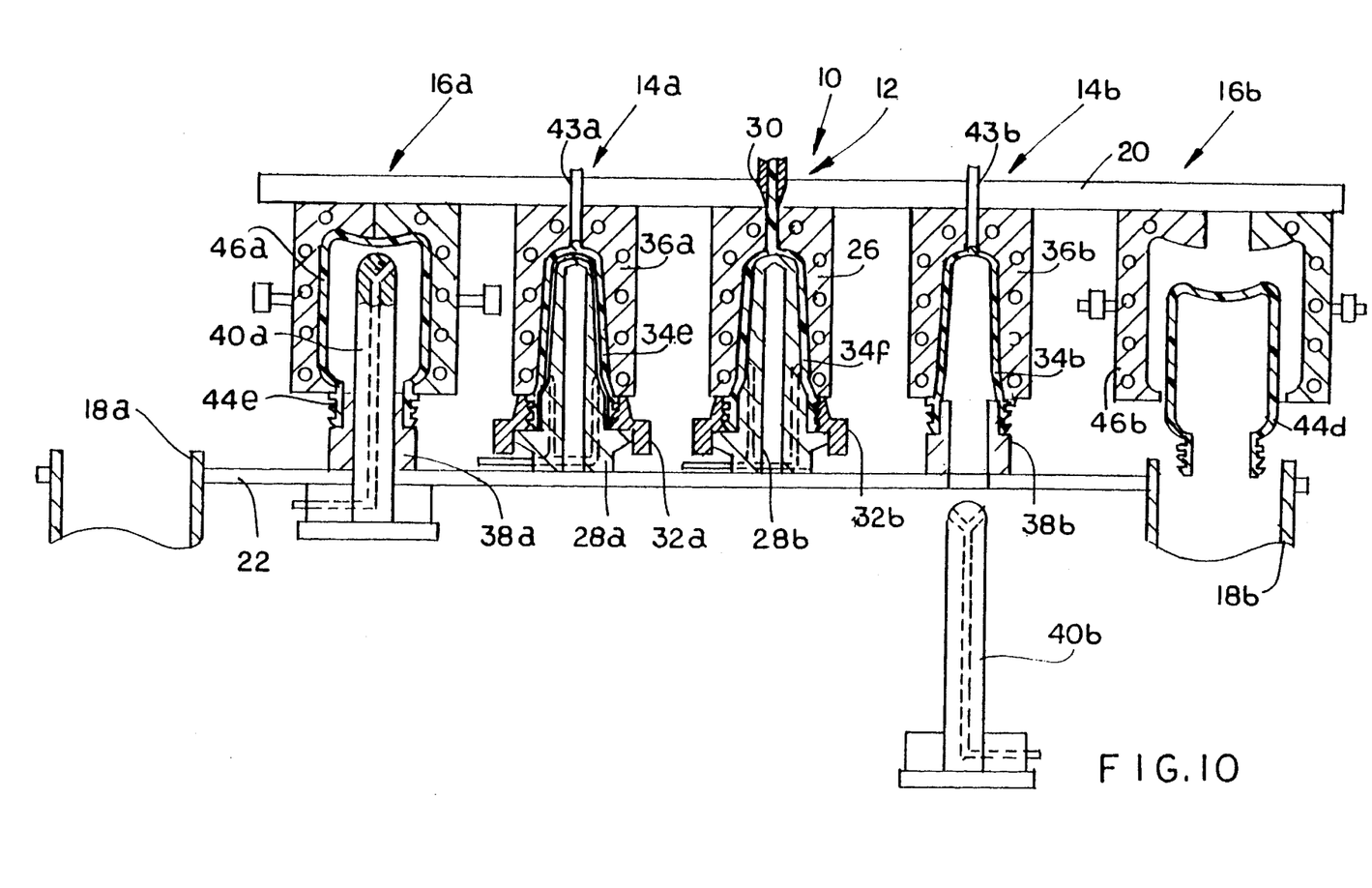
FIG. 10 is a similar plan view with the press clamped to start the next injection molding cycle, cooling cycle and orient-stretch blow cycle.
Figure 11:
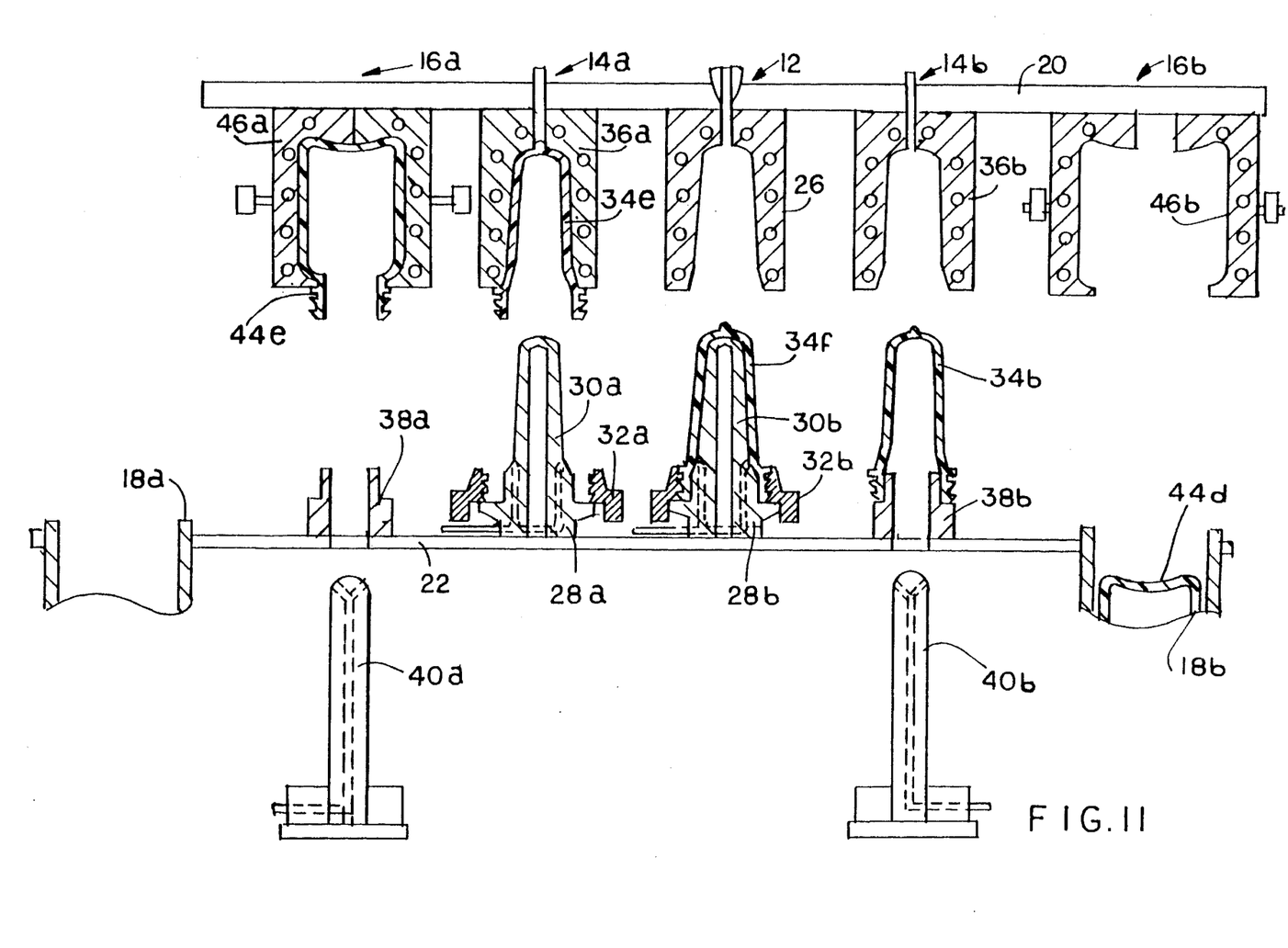
FIG. 11 is a similar view with the press opened.
Figure 12:
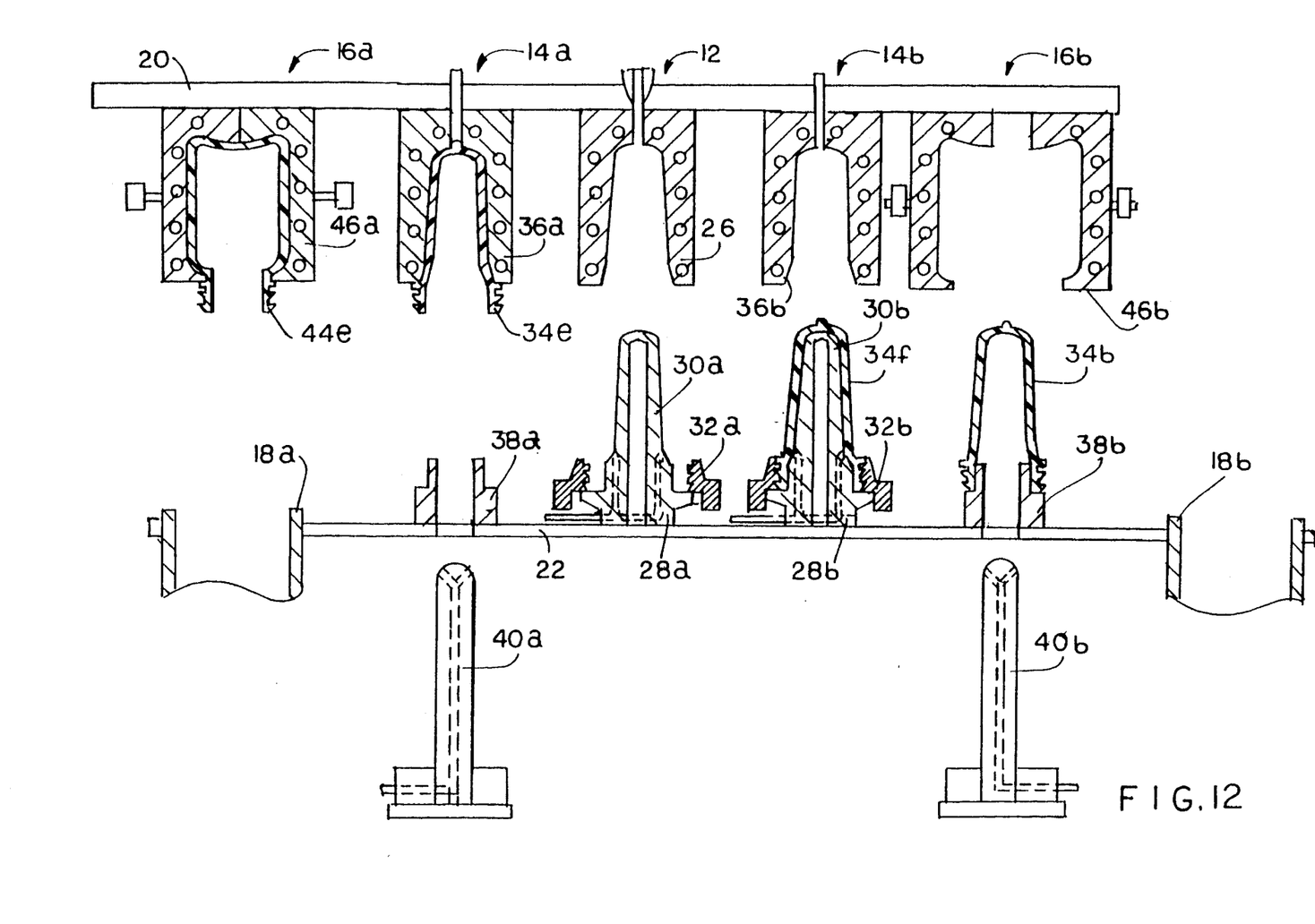
FIG. 12 is a similar view with the press still opened and the press shifted and indexed to the right.

The platen 22 is then reciprocated axially to place core rod assembly 28b with closed neck mold 32b in association with injection mold 26 at injection molding station 12 as shown in FIG. 4. Parison 34a will be placed in cooling mold 36a at cooling station 14a while on core rod 30a and closed neck mold 32a. Transfer core bushing 38a will have transferred parison 34c to orient-stretch blow station 16a and transfer core bushing 38b will be associated with the neck of parison 34b. The next parison injection molding cycle will commence to form parison 34d. The indexing sequence previously described will be repeated to eventually associate neck mold 32a and core rod assembly 28a once again with the mold 26 of injection molding station 12.

FIGS. 1–12 depict the path of travel of parison 34a from its formation to its ejection as a blown bottle 44e and of course the path of travel of parisons and blown bottles formed prior and subsequently.

As explained, at stations 14a and 14b, the space between the cooling cavity and outer parison wall allows the preform parison to be blown off the associated core rods 30a, 30b as well as separated from the core rods 30a, 30b. The blow air forces the parison against the wall of the cooling cavity to remove the heat from the plastic parison while freeing it from the core rod.

Although a single row of stations are illustrated in the drawings, it should be understood that multiple rows of such stations may be on the platens 20 and 22, not only in a horizontally disposed line as illustrated, but vertical or in parallel lines; and similarly, the platens 20 and 22 could be horizontally disposed rather than being vertical as shown where desired or necessary.

Mechanism for accomplishing the axial reciprocation of platen 22 and the lateral reciprocation of platen 22 is of a well known type in the art and for this reason will neither be discussed or illustrated.

The chute at ejection stations 18a and 18b may be located on the stationary platen 20, in which event another pair of transfer bushings 38c and 38d may be on the platen 22 to transfer blown bottles from the orient-stretch blow stations 16a and 16b to ejection stations 18a and 18b. This transfer arrangement and ejection station location will parallel that shown in FIG. 14.

Figure 13:
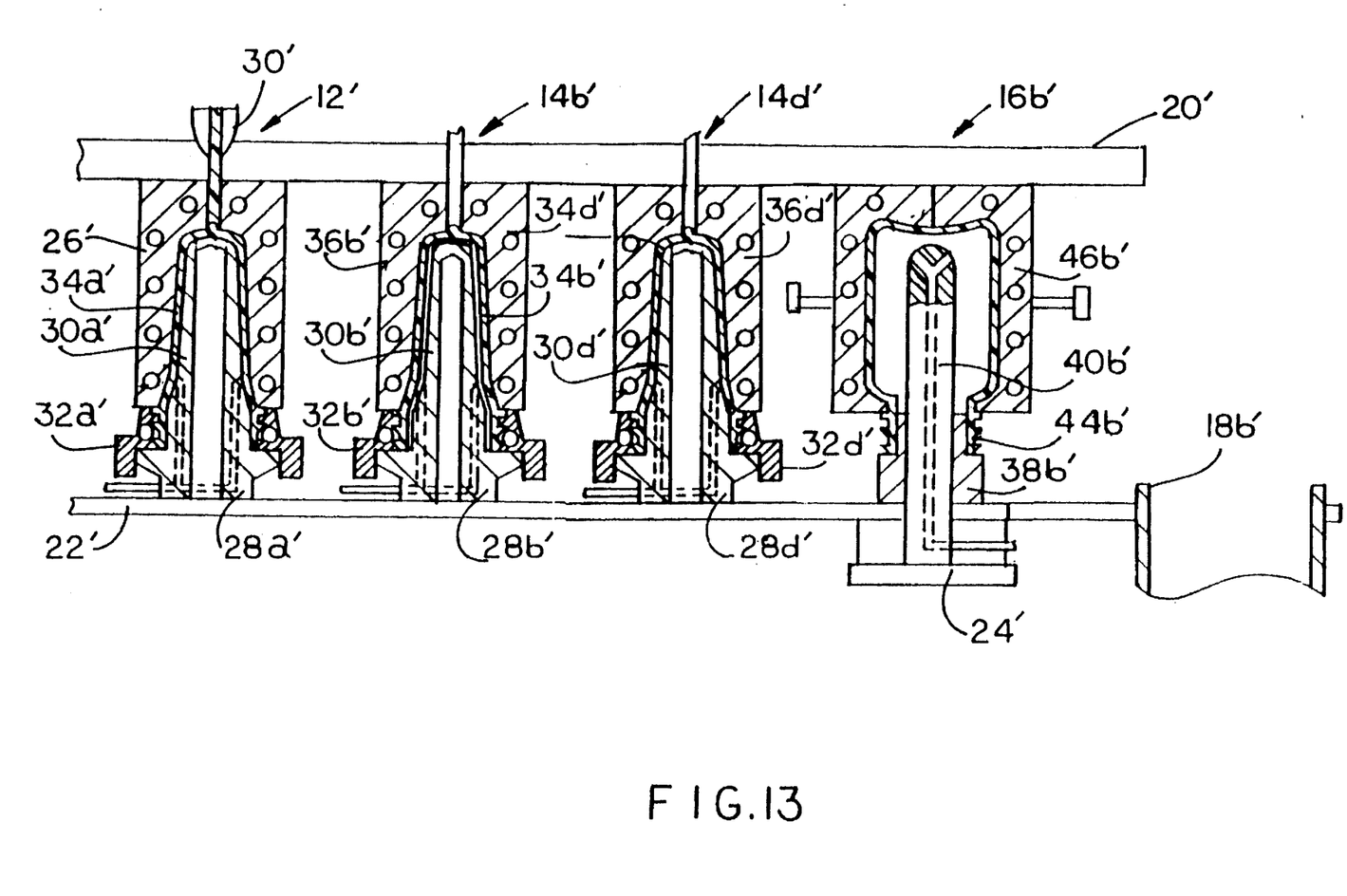
FIG. 13 is a plan view with additional cooling stations incorporated.

FIG. 13 shows an alternative embodiment demonstrating how the versatility of the present invention permits the introduction of more cooling stations. In this embodiment, similar components will be similarly numbered with an accompanying prime "'". In this regard, an additional cooling station 14c', 14d' is interposed between cooling stations 14a', 14b' and orient-stretch blow stations 16a', 16b'. This could contribute to even lesser injection molding cycles as well as attainment of more cooling should the parison wall thickness require it. Of course not only would additional molds 36c', 36d' be on platen 20' but additional transfer core rod assemblies 28c', 28d' or where necessary or desired additional neck molds may be utilized on platen 22'.

It should be understood, that the present invention contemplates forming a skin on the inner and outer surfaces of the parison so that the parison is properly and correctly "seasoned" or conditioned for stretching and blowing at stations 16a" and 16b". In this regard and with specific reference to FIG. 14, where like parts will be similarly numbered with an accompanying double prime "''", elevated temperatures may be desired along certain parts or sections of the parisons for the desired seasoning. Whether heating or cooling is required depends on the type of plastic material being molded. More often than not, the neck molds 32a" and 32b" together with transfer core brushing 38a", 38b" will be cooled to cool and set the configuration of the parison and bottle neck as early as possible in the molding process.

Figure 14:
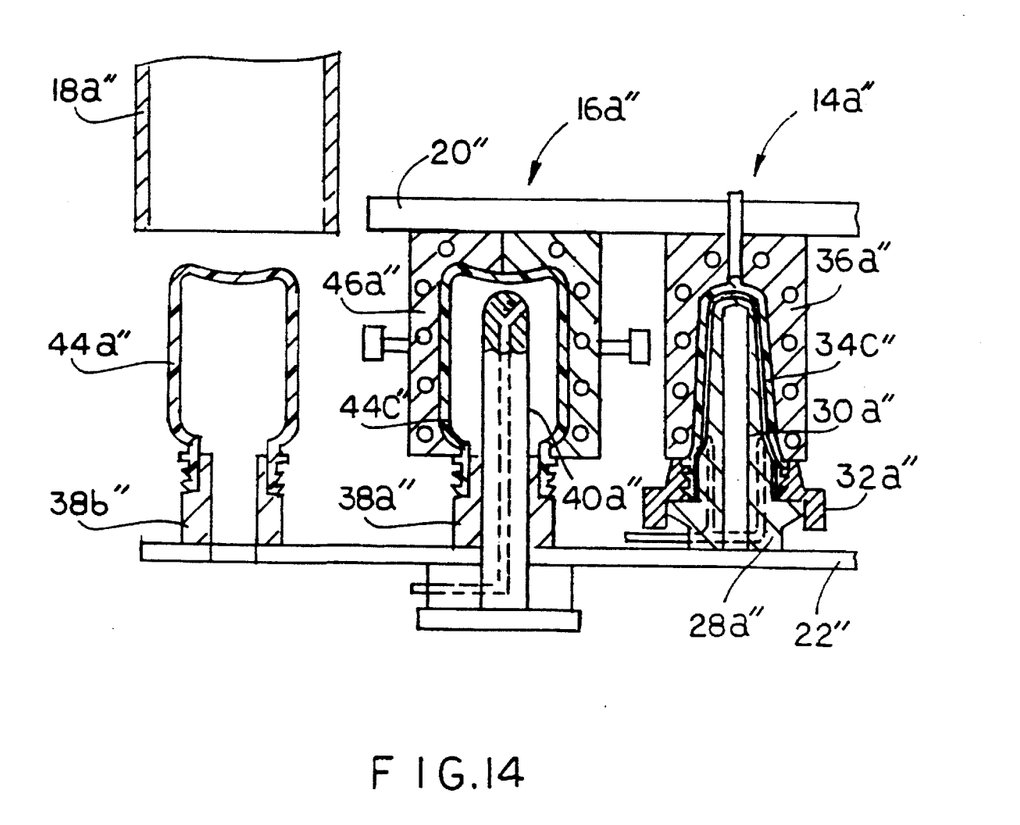
FIG. 14 is a plan view showing the incorporation of pre-cure stations with the preferred method of bottle discharge.

Thus, in FIG. 14 stations 14c" and 14d" may serve as separate pre-cure stations immediately before the orient-stretch blow stations 16a", 16b". Molds 36c" and 36d" may serve as pre-cure molds on platen 20" and core rod assemblies 28c" and 28d" may serve as pre-cure core rod assemblies on platen 22". The pre-cure molds 36c" and 36d" and pre-cure rod assemblies 28c" and 28d" can be heated or cooled at preselected zone as desired in obtaining the desired conditioning and/or seasoning of the parisons prior to orient-stretch blowing. The sequence of operational steps in the embodiment of FIG. 14 is otherwise identical to those depicted in the previous embodiment, of course, with the addition of the additional pre-curing stations The parison can, if desired, at these stations, be slightly expanded or preblown. The pre-cure mold 36c", 36d" can be split or of one piece design Thus, the several aforenoted objects and advantages are more effectively attained Although a several somewhat preferred embodiments have been disclosed and described in detail herein, it should be understood that the invention is in no sense limited thereby but its scope is to be determined by that of the appended claims.

I claim:

1. A method of injection blow molding oriented finished blown bottles with minimum injection molding times with selectively increased parison cooling times for optimum production of selected oriented finished bottles, comprising:

a) injection molding a first parison at an injection molding station around a first core rod assembly;

b) providing cooling stations located on opposite sides of the injection molding station;

c) moving the first parison from the injection molding station to one of the cooling stations at which the first parison is cooled and supporting it along its entire length on and cooling the first parison by the first core rod assembly during this movement and while at the first cooling station;

d) injection molding a second parison at the injection molding station around a second core rod assembly while the first parison is being cooled at the one of the cooling stations;

e) moving the second parison to the other cooling station at which the second parison is cooled and supporting it along its entire length on and cooling the second parison by the second core rod assembly during this movement and while at the other cooling station;

f) injection molding a third parison at the injection molding station while the first parison is still being cooled at the one of the cooling stations and the second parison is being cooled at the other of the cooling stations;

g) providing at least two orient-stretch blow molding stations, one on one side and the other on an opposite side of the injection molding station with a cooling station interposed between the injection molding station and each orient-stretch blow molding station;

h) moving the first parison to the one of the orient-stretch blow molding stations; and moving the third parison to said one of the cooling stations and supporting it along its entire length on and cooling the third parison by said first core rod assembly during this movement and while at the one of the cooling stations;

i) injection molding a fourth parison at the injection molding station while the first parison is stretched and blown into a finished blown bottle and the second and third parisons are at the respective other and one of the cooling stations; and repeating steps a) through i) to form other parisons and finished bottles.

2. The method of claim 1 including the step of moving the finished blown bottle to an ejection station at which the finished blown bottle is transported to a collection area.

3. The method of claim 1 including the step of providing an additional cooling stations so that one additional cooling station is between the one cooling station and the injection station and the other additional cooling station is between the other cooling station and the injection station to cool the parisons further before blowing parisons into finished blown bottles.

4. The method of claim 1 including the step of providing a conditioning station between the one cooling station and the one orient-stretch blow molding station and another conditioning station between the other cooling station and the other orient-stretch blow molding station to condition the parisons for blowing into finished bottles.

* * * * *